Patented Mar. 8, 1949

2,463,897

UNITED STATES PATENT OFFICE 2,463,897

TRICHLOROSTYRENE AND POLYMERS THEREOF

John C. Michalek, Niagara Falls, N. Y., assignor to Mathieson Chemical Corporation, New York, N. Y., a corporation of Virginia No Drawing. Original application September 4, 1942, Serial No. 457,311. Divided and this application May 5, 1948, Serial No. 25,315

3 Claims. (Cl. 260—74)

This invention is concerned with new vinyl compounds and contemplates polymerizable trichlorostyrene and polymers and copolymers thereof.

It has been proposed heretofore to employ polymerizable styrenes and ring alkyl substituted styrenes in the preparation of thermoplastic resins. However, trichlorostyrene heretofore available has not been useful in the formation of polymers and copolymers, because it is stable and shows no tendency to polymerize under the action of either light or heat. In these circumstances, the use of trichlorostyrene has been distinctively limited.

As the result of my investigations, I have produced monomeric nuclear trichlorostyrenes that are polymerizable and that may be converted into resins having high dielectric strength and which have a higher softening point and are markedly less brittle than the resins heretofore derived from styrenes. Thus, I have discovered that monomeric nuclear trichlorostyrenes that are sufficiently pure, especially with reference to chlorine in the side chain, are polymerizable and form resins and other plastics having highly desirable properties.

My preferred method of preparing polymerizable monomeric nuclear trichlorostyrenes is by demuriation (dehydrohalogenation) of tetrachloroethylbenzene having one chlorine in the ethyl group and three chlorine atoms in the ring, the demuriation being conducted in the presence of a catalyst. The mixed isomers or the individual isomers of tetrachloroethylbenzene may be employed in the practice of the invention, according to the reaction

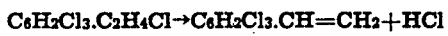

$$C_6H_2Cl_3.C_2H_4Cl \rightarrow C_6H_2Cl_3.CH=CH_2 + HCl$$

Catalytic demuriation permits substantially complete removal of chlorine from the side chain, and the demuriation should be continued until only a small proportion say less than 2% of the original side chain chlorine remains. Thus the side chain chlorine should be reduced from about 14% (the side chain chlorine content of tetrachloroethylbenzene) to about .3% or less in the trichlorostyrene product.

I prefer to employ the mixture of isomers of tetrachloroethylbenzene obtained by direct chlorination of ethyl benzene. The ring of the ethyl benzene is conveniently chlorinated in the presence of a nuclear substitution catalyst such as antimony pentachloride, iron, iron chloride and the like. After introduction of the desired amount of halogen into the ring, the mixture is freed of nuclear substitution catalyst, preferably fractionated to purify it and thereafter halogenated in the side chain. In this second halogenation step approximately one atom of chlorine is introduced into the ethyl group of the side chain. The tetrachloroethylbenzene thus derived is subjected to catalytic demuriation to produce the polymerizable trichlorostyrene as described hereinafter.

The tetrachloroethylbenzene for catalytic demuriation may be the high boiling material which is separated from nuclear dichloroethylbenzene in the purification of the latter compound by fractional distillation. This high boiling material is largely nuclear trichloroethylbenzene. After such material is chlorinated in the side chain, it may be demuriated catalytically to yield polymerizale monomeric nuclear trichlorostyrene.

In the side chain chlorination of ethyltrichlorobenzene, the chlorine appears to enter both alpha and beta positions. Removal of the chlorine from the alpha position is relatively easy, but effective removal of chlorine in the beta position requires the presence of an effective demuriation catalyst. In consequence, such a demuriation catalyst should be employed to bring about substantially complete demuriation of the side chain chlorine with resultant formation of a polymerizable trichlorostyrene.

I have found that catalysts which bring about successful and substantially complete demuriation of chlorine in both the alpha and beta positions include floridin, activated alumina and the catalysts described in co-pending application Serial No. 457,194, filed September 3, 1942, now United States Patent No. 2,363,011, namely, mixtures of phosphates of alkaline earth metals (including magnesium) with phosphates of elements of variable valence selected from series 4 of the periodic table. Conveniently, the catalyst is a mixture of alkaline earth phosphate, for example magnesium phosphate, with the phosphate of an element of variable valence such as cobalt, chromium or manganese.

The mixture of phosphates preferably is deposited on a suitable carrier of aluminum oxide or silicate which may be either natural or synthetic. Suitable carriers for the catalyst of mixed phosphates include kaolin, porcelain, and Florida earth (floridin). My preferred catalyst of mixed phosphates should contain about 2 moles of alkaline earth phosphate to one mole of the phosphate of the element of variable valence. Thus the catalyst may contain two moles of alkaline earth phosphate to one mole of cobalt phosphate. In some instances, it may be desirable to employ the phosphate of more than one element of variable valence, one mole of alkaline earth phosphate being employed for each mole of the phosphates of variable valence. By way of example, a suitable catalyst comprises two moles of alkaline earth phosphate to one mole of cobalt phosphate and one mole of chromium phosphate.

I have found that it is possible to produce polymerizable monomeric nuclear trichlorostyrene from various isomeric trichlorobenzaldehydes or mixtures thereof. Thus trichlorobenzaldehydes may be converted to their methylcarbinols by reaction with methyl magnesium halide and other suitable methylating agents. The resulting methylcarbinols may be dehydrated to form trichlorostyrenes. If the operation is properly conducted so as to produce substantially pure nuclear trichlorostyrenes the product will be polymerizable.

It is important to fractionate carefully all of the intermediate products. Such careful fractionation appears to remove impurities which tend to stabilize nuclear trichlorostyrene and thus inhibit polymerization. For example, the direct chlorination of ethyl benzene in the presence of a nuclear substitution catalyst should be followed by a careful fractionation prior to halogenation of the side chain. The tetrachloroethylbenzene resulting from halogenation of the side chain should also be carefully fractionated to remove impurities prior to demuriation. It is also important that the demuriation step be practiced carefully and that the demuriation of the side chain be substantially complete. Otherwise, probably due to the presence of impurities, or to the presence of chlorine in the side chain, the trichlorostyrene may be too stable for polymerization.

The polymerizable monomeric nuclear trichlorostyrene of my invention, for example that derived by thorough catalytic demuriation of tetrachloroethylbenzene is a highly refractive liquid with a low vapor pressure. It polymerizes rather slowly at room temperature but on heating, especially in the presence of catalyst including peroxides, such as ascaridole, benzoyl peroxide and the like, the trichlorostyrene polymerizes to a clear tough plastic having a high dielectric strength, low dielectric loss and also a high softening point. In this connection, it should be noted that the individual isomers, such as 2,4,6-trichlorostyrene polymerize to produce plastics that have higher softening points than those obtained from the polymerization of the mixed isomers. Consequently, the polymerized individual isomers are particularly desirable in some applications.

As indicated hereinbefore, the monomeric trichlorostyrenes of my invention may be polymerized with other polymerizable materials, including styrene and styrene derivatives. Thus, my monomeric trichlorostyrenes may be copolymerized with dichlorostyrenes with which they are miscible in all proportions and which they serve to plasticize. Styrene itself and various other substituted styrenes including a variety of halogenated styrenes, alkylated styrenes, the styrene compound derived from ethyl p-ethyl-benzoate by dehydrogenation of the ring ethyl group may be polymerized with my trichlorostyrenes to yield desirable copolymers.

Vinyl compounds other than the styrenes and substituted styrenes may also be copolymerized with the trichlorostyrenes of my invention. Thus, vinyl acetate, vinyl chloride, vinylnaphthalene and halogenated and otherwise substituted vinyl-naphthalenes, allyl esters of methacrylic acid and of maleic acid and the like, chloroprene, butadiene, methyl and phenyl substituted butadiene and other dienes may be copolymerized with my trichlorostyrenes to obtain desirable products.

The copolymerization may be conducted with or without solvents. In the absence of solvents the copolymerization yields exceedingly tough plastics.

The copolymerization may occur in water dispersion. Thus, copolymerization of the trichlorostyrene with butadiene in water in the presence of various modifying and dispersing agents results in a rubber like product which is completely non-flammable.

The following examples illustrate the presently preferred methods for producing the products of the invention:

*Example 1*

Demuriation of alpha-chloroethyl-trichlorobenzene was accomplished by vaporizing this compound in nitrogen at a pressure of 10 mm. of mercury over an activated alumina catalyst which was heated to a temperature range of 365° C. to 377° C. The resulting product was washed with water, dried and carefully fractionated at a pressure of 1 to 2 mm. of mercury, the trichlorostyrene fraction boiling in the range from 84° C. to 94° C. being taken as the product. This fraction subsequently was polymerized to form an exceptionally hard plastic with a high softening point. However, the plastic was not brittle. Polymerization was accomplished by heating the trichlorostyrene in the presence of benzoyl peroxide for 200 hours at a temperature of 70° C.

*Example 2*

Ethyl benzene was chlorinated in the ring to form trichloroethylbenzene, iron being employed as the catalyst. The trichloroethylbenzene, after fractionation to increase its purity, was chlorinated in the side chain in light at a temperature of about 80° C., thus forming chloroethyl-trichlorobenzene, which was recovered by careful fractionation at 1 mm. pressure. This recovered material had a boiling point of 106° C. and an index of refraction $N_D^{25°}$ of about 1.5810. The side chain contained 13.48% chlorine as compared to a theoretical content of 14.55% in pure alpha-chloroethyl-trichlorobenzene.

In another instance, the chloroethyl-trichlorobenzene prepared as described above was subjected to careful fractionation, the fraction boiling in the range of 118–122° C. at 2 mm. mercury being taken as the product. This fraction had an index of refraction $N_D^{25°}$ of about 1.5787 and contained 14.25% of side chain chlorine and hence was substantially pure alpha-chloroethyl-trichlorobenzene. This material was demuriated by vaporizing it over a catalyst of floridin earth coated with the mixed phosphates of magnesium, chromium and cobalt prepared as described above at a temperature of 285° C. to 300° C. under reduced pressure. The product of the demuriation was carefully fractionated at a pressure of about 1 mm. of mercury, the fraction boiling at 81° C. to 84° C. being recovered. This recovered fraction had an index of refraction $N_D^{25°}$ of 1.5943 and contained only 0.12% side chain chlorine, so that it was substantially pure nuclear polymerizable trichlorostyrene.

Example 3

Vapors of alpha-chloroethyl-trichlorobenzene were preheated to 390° C. and demuriated by passing them over the catalyst of floridin earth used in Example 2 at reduced pressure.

The demuriated material was fractionated carefully at a pressure of 1.5 mm. of mercury and the fractions boiling in the range from 82° C. to 85° C. and having indices of refraction $N_D^{25°}$ ranging from 1.5949 to 1.5950 were combined as a product. This product contained 0.21% side chain chlorine and hence was substantially pure nuclear trichlorostyrene.

It was found that the trichlorostyrene thus produced was polymerizable.

Example 4

Ethyl benzene was chlorinated in the ring to produce trichloroethylbenzene, employing iron as a catalyst. The product was side chain chlorinated in light at about 80° C. to produce alpha-chloroethyl-trichlorobenzene. This was carefully fractionated at 2 mm. pressure. The fraction boiling at 118-122° C. was taken as the product. This product had an index of refraction $N_D^{25°}$ of 1.5787 and contained 14.25% side chain chlorine as compared with a theoretical chlorine content of 14.55%.

The alpha-chloroethyl-trichlorobenzene produced as described above was vaporized over floridin at 285° C. to 300° C. under reduced pressure. This brought about thorough demuriation. The product of demuriation was carefully fractionated at about 1 mm. Hg and the fraction boiling at 81° C. to 84° C. and having a refractive index $N_D^{25°}$ of 1.5943 was taken. This fraction contained only .12% side chain chlorine and hence was substantially pure nuclear trichlorostyrene.

Polymerization of the monomeric nuclear trichlorostyrene produced as described above was conducted by mixing it with .1% by weight of benzoyl peroxide. The mixture was placed in a tube and after the air in the tube was displaced with nitrogen, the tube was sealed and heated at 60° C. It was maintained at this temperature for 18 hours during which the monomeric material had polymerized to form a solid that contained substantially no bubbles. The polymerized product was less brittle than polystyrene. Moreover, it had a high temperature of distortion, namely, 120° C. This is approximately 40° C. higher than the temperature of distortion of styrene and 20° C. above the temperature of distortion of dichlorostyrene polymer.

The polymerized trichlorostyrene had a density $D_4^{25°}$ of about 1.515.

This application is a division of my co-pending application Serial No. 457,311, filed September 4, 1942, now abandoned.

I claim:

1. A thermoplastic resin consisting of polymerized nuclear trichlorostyrene, said nuclear trichlorostyrene in monomeric form having a side chain chlorine content of less than 0.3%.

2. A thermoplastic resin consisting of a polymer of a mixture of all of the position isomers of nuclear trichlorostyrene.

3. A mixture of monomeric nuclear trichlorostyrenes resulting from subjecting a mixture of the position isomers of chloro-ethyl-trichlorobenzene produced by the direct chlorination of ethylbenzene to catalytic dehydrochlorination in the presence of a dehydrochlorinating catalyst selected from the group consisting of alumina, floridin and mixtures of magnesium phosphate with a phosphate of an element selected from the class consisting of cobalt, chromium and manganese, and fractionally distilling the product of dehydrochlorination to recover a fraction boiling at 81°-85° C. at a pressure of 1 to 2 mm. of mercury, said monomeric mixture having the property of polymerizing under the action of heat and having a side chain chlorine content of less than 0.3%, and a refractive index of 1.5943 to 1.5950.

JOHN C. MICHALEK.

REFERENCES CITED

The following references are of record in the file of this patent:

UNITED STATES PATENTS

| Number | Name | Date |
|---|---|---|
| 2,363,011 | Michalek | Nov. 21, 1944 |